United States Patent
Greve et al.

(10) Patent No.: US 9,622,494 B2
(45) Date of Patent: Apr. 18, 2017

(54) SHRIMP DEVEINER WITH ADJUSTABLE BLADES

(71) Applicant: Laitram, L.L.C., Harahan, LA (US)

(72) Inventors: Christopher G. Greve, Covington, LA (US); Robert S. Lapeyre, New Orleans, LA (US); Charles L. Borrello, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/187,414

(22) Filed: Jun. 20, 2016

(65) Prior Publication Data

US 2017/0006885 A1    Jan. 12, 2017

Related U.S. Application Data

(60) Provisional application No. 62/190,437, filed on Jul. 9, 2015.

(51) Int. Cl.
*A22C 29/00* (2006.01)
*A22C 29/02* (2006.01)
*B65G 53/02* (2006.01)

(52) U.S. Cl.
CPC .......... *A22C 29/022* (2013.01); *A22C 29/023* (2013.01); *B65G 53/02* (2013.01)

(58) Field of Classification Search
CPC ..... A22C 29/00; A22C 29/022; A22C 29/026; A22C 29/005
USPC ....................................... 452/1-3
See application file for complete search history.

(56) References Cited

U.S. PATENT DOCUMENTS

| 2,545,517 | A | * | 3/1951 | Harris | A22C 29/025 |
| | | | | | 209/158 |
| 2,694,218 | A | | 11/1954 | Lapeyre et al. | |
| 3,566,437 | A | | 3/1971 | Jonsson | |
| 3,703,746 | A | | 11/1972 | Jones, Jr. | |
| 3,787,928 | A | | 1/1974 | Domecki | |
| 3,867,740 | A | | 2/1975 | Lapine et al. | |
| 4,104,764 | A | * | 8/1978 | Coast | A22C 29/025 |
| | | | | | 452/1 |
| 4,393,543 | A | | 7/1983 | Martin | |

(Continued)

FOREIGN PATENT DOCUMENTS

| CN | 104222249 A | 12/2014 |
| CN | 104222250 A | 12/2014 |

(Continued)

OTHER PUBLICATIONS

International Search Report and Written Opinion of the International Searching Authority, PCT/US2016/038469, mailed Oct. 19, 2016, Korean Intellectual Property Office.

*Primary Examiner* — Richard Price, Jr.
(74) *Attorney, Agent, or Firm* — James T. Cronvich

(57) ABSTRACT

A shrimp deveining machine with adjustable blades. The deveiner has an inclined trough with groups of blades arranged in a zig-zag pattern. The trough is lubricated by water to help shrimps advance along the blades, which slit the shrimps' backs to expose their veins. Blade-height adjusters adjust the height of the blades above the trough. Blade-angle adjusters adjust the angles of the blades relative to the length direction of the trough. Magnets are used to hold the blades in place for easy replacement. A feed tank at the entrance to the trough includes a serpentine path to separate the shrimps.

27 Claims, 15 Drawing Sheets

(56) References Cited

U.S. PATENT DOCUMENTS

| | | | |
|---|---|---|---|
| 4,414,709 A | 11/1983 | Betts | |
| 4,745,660 A | 5/1988 | Betts et al. | |
| 4,816,276 A | 3/1989 | Blazevich | |
| 4,996,744 A | 3/1991 | Meyer | |
| 5,290,199 A | 3/1994 | Morris | |
| 5,346,424 A * | 9/1994 | Chiu | A22C 29/026 452/184 |
| 5,569,065 A | 10/1996 | Sawyer et al. | |
| 5,613,903 A | 3/1997 | Harris et al. | |
| 5,839,952 A * | 11/1998 | Pollingue | A22C 29/023 452/2 |
| 5,980,373 A * | 11/1999 | Rosow | A22C 29/026 452/2 |
| 6,200,209 B1 | 3/2001 | Shelton | |
| 6,273,807 B1 | 8/2001 | Shelton | |
| 7,179,160 B2 * | 2/2007 | Hulin | A22C 29/005 452/2 |
| 7,467,992 B2 | 12/2008 | Sawyer | |
| 7,867,067 B2 | 1/2011 | Dancy et al. | |
| 8,079,896 B1 | 12/2011 | Sawyer | |
| 8,177,609 B2 * | 5/2012 | Andersen | A22C 29/028 452/1 |
| 8,640,878 B2 | 2/2014 | Greve et al. | |
| 2002/0142714 A1 | 10/2002 | Keith | |
| 2014/0187132 A1 | 7/2014 | Rau et al. | |
| 2015/0147946 A1 | 5/2015 | Liang | |
| 2016/0192666 A1 | 7/2016 | Vedsted et al. | |

FOREIGN PATENT DOCUMENTS

| | | |
|---|---|---|
| CN | 204377789 U | 6/2015 |
| WO | 200207525 A1 | 1/2002 |

* cited by examiner

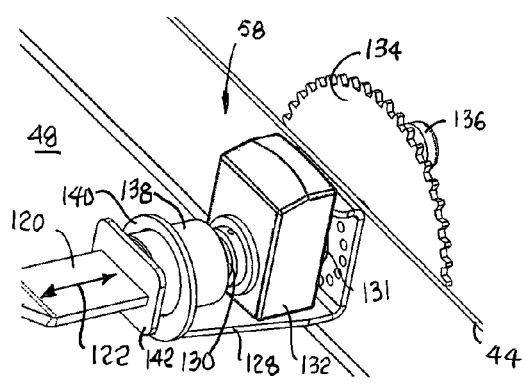
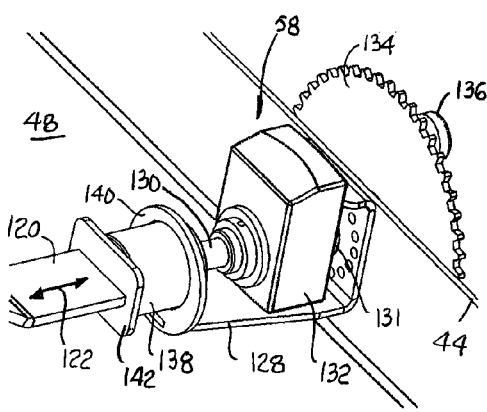
FIG. 6A
FIG. 6B
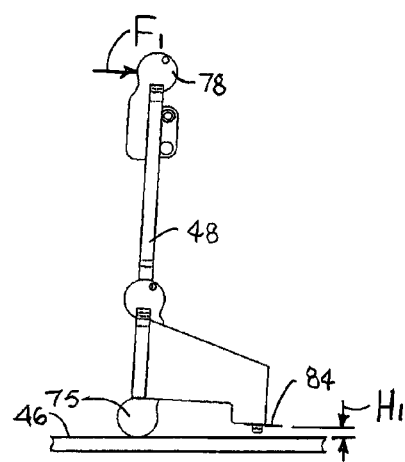
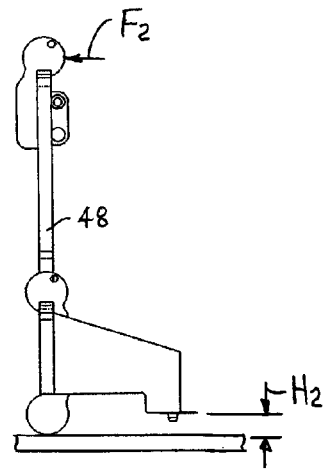
FIG. 7A
FIG. 7B

SHRIMP DEVEINER WITH ADJUSTABLE BLADES

BACKGROUND

The invention relates to deveining shrimp.

An automatic shrimp-deveining machine for handling high volumes of shrimp is described in U.S. Pat. No. 2,694,218, "Shrimp Deveining Machine," F. S. Lapeyre et al., Nov. 16, 1954. That machine, shown in FIGS. 25 and 26, slits the back of a shrimp to expose and release the alimentary canal, or vein, to improve the appearance and delectability of the shrimp meat. The machine 20 has an inclined trough 22 supported in a frame 24 that allows manual adjustment of the inclination. A series of blade assemblies 26 are affixed to the trough 22. The blade assemblies 26 have knife blades 28 clamped between upper and lower clamp blocks 30, 31. The blade assemblies 26 are arranged angularly, or diagonally, with respect to the length of the trough 22 in a zig-zag pattern down the trough. Peeled shrimps are delivered to the upper end of the trough 22 by an infeed conveyor 32. The shrimps, lying on their sides, advance by gravity down the trough 22 in a zig-zag path P along the blade assemblies 26. Spray nozzles 34 direct water to lubricate the trough to help the shrimps advance, to wash the veins from the shrimps, and to clean the blade assemblies 26. Each shrimp slides down the water-lubricated trough 22 and successively encounters the blade assemblies. The blades 28 sever the membrane covering the vein. Multiple blade assemblies 26 are used to ensure that the membrane is severed along substantially the entire back of the shrimps. The water spray washes the exposed vein away. The deveined shrimps are carried away on a discharge conveyor 36 at the bottom end of the trough 22.

Commercial versions of the Lapeyre deveiner 20 work well, but have some shortcomings. For example, the height of the blades 28 above the trough 22 is fixed by the thickness of the lower blocks 31. To change blade heights, the lower blocks have to be changed. Replacing worn blades 28 is also a time-consuming task because the top clamp blocks 30 have to be removed to replace the blades. And changing the angles of the blade assemblies 26 also requires unbolting and re-bolting the assemblies one at a time. In operation the deveiner 20 has some shortcomings. For example, the blade assemblies 26 form barriers against which the water piles up. If too much water piles up, it can interfere with the shrimps' encounter with the blades 28.

SUMMARY

One version of a shrimp deveining machine embodying features of the invention comprises an inclined trough having a base surface down which shrimps advance, a water supply to the inclined trough, and a series of blade assemblies that hold blades spaced above the base surface and that extend obliquely across and down the trough in successively opposite oblique directions. The blade assemblies include channels to allow water to pass through the blade assemblies without building up at the blades.

Another version of a shrimp deveining machine embodying features of the invention comprises an inclined trough having a base surface down which shrimps advance and a series of blade assemblies that hold blades with blade edges spaced above the base surface and that extend obliquely across and down the trough in successively opposite oblique directions. Each of the blade assemblies has a bottom side and an opposite top side and includes a pivot foot at the bottom side at the base surface and a first pivot member at the top side. A blade-height adjustment mechanism includes a height-adjustment arm pivotally connected to the first pivot member to pivot the blade assembly on the pivot foot about a tilt axis on the base surface to adjust the height of the blade edge above the base surface.

Still another version of a shrimp deveining machine embodying features of the invention comprises an inclined trough having a base surface down which shrimps advance and a series of blade assemblies that hold blades spaced above the base surface and that extend across and down the trough on oblique angles in successively opposite oblique directions. Each of the blade assemblies has a bottom side and an opposite top side and includes a pivot foot at the bottom side at the base surface and a pivot member near an end of the blade assembly. An angle-adjustment arm pivotally connected to the pivot member pivots the blade assembly on the pivot foot about a pivot axis perpendicular to the base surface to adjust the oblique angle of the blade.

Yet another version of a shrimp deveining machine embodying features of the invention comprises an inclined trough having a base surface and a series of blade assemblies holding blades spaced above the base surface and extending obliquely across and down the trough in successively opposite oblique directions. The blades are made of a ferromagnetic material, and the blade assemblies include magnets attracting the blades and retaining the blades in place in the blade assemblies.

Still another version of a shrimp deveining machine embodying features of the invention comprises an inclined trough extending from an upper entrance to a lower exit and having a base surface, a series of blade assemblies holding blades spaced above the base surface and extending obliquely across and down the trough in successively opposite oblique directions, and a feed system delivering shrimps to the inclined trough at the upper entrance. The feed system includes a source of water providing a flow of shrimp-laden water and a tank forming a serpentine path for the shrimp-laden water.

BRIEF DESCRIPTION OF THE DRAWINGS

FIGS. 6A and 6B are isometric views of a blade-height adjuster in low- and high-height positions for a deveining machine as in FIG. 1;

FIGS. 7A and 7B are side views of the blade assembly corresponding to the blade-height positions of FIGS. 6A and 6B;

DETAILED DESCRIPTION

Figure 1:
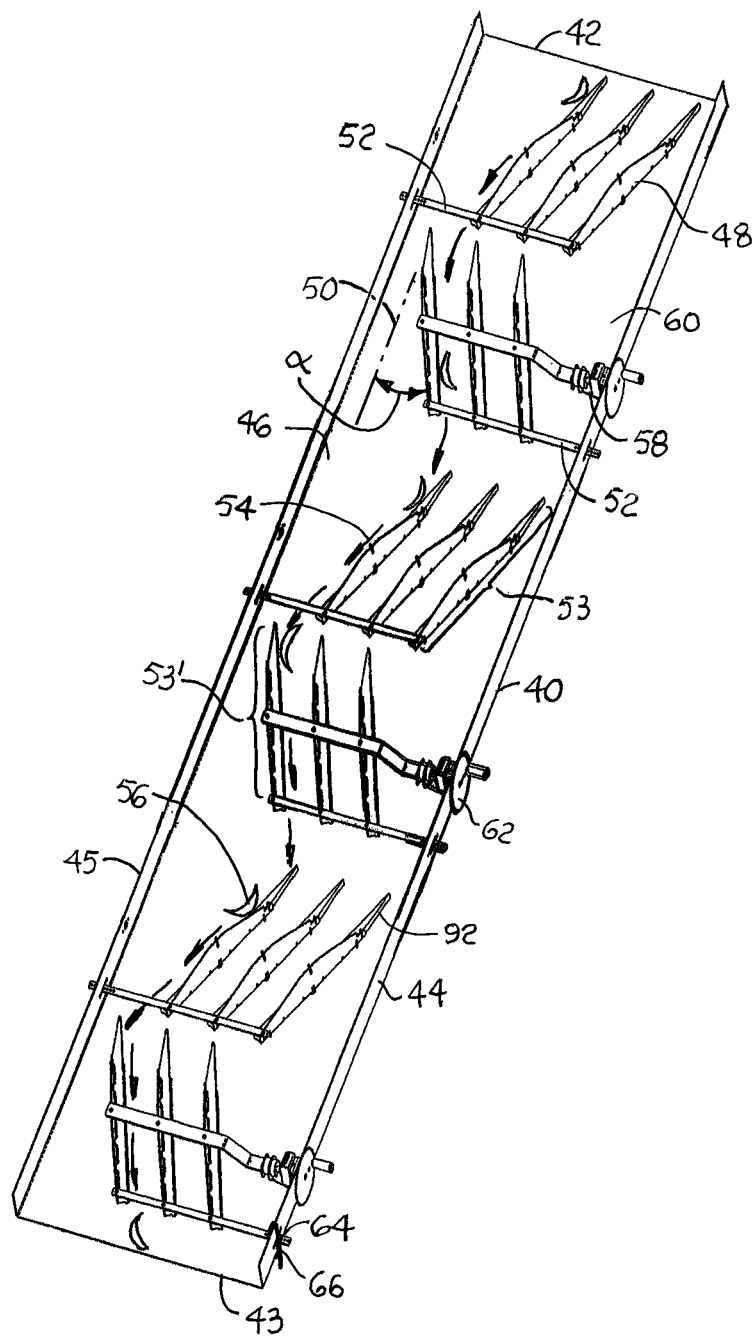
FIG. 1 is an illustration of the inclined trough of a deveining machine embodying features of the invention.
Figure 18:
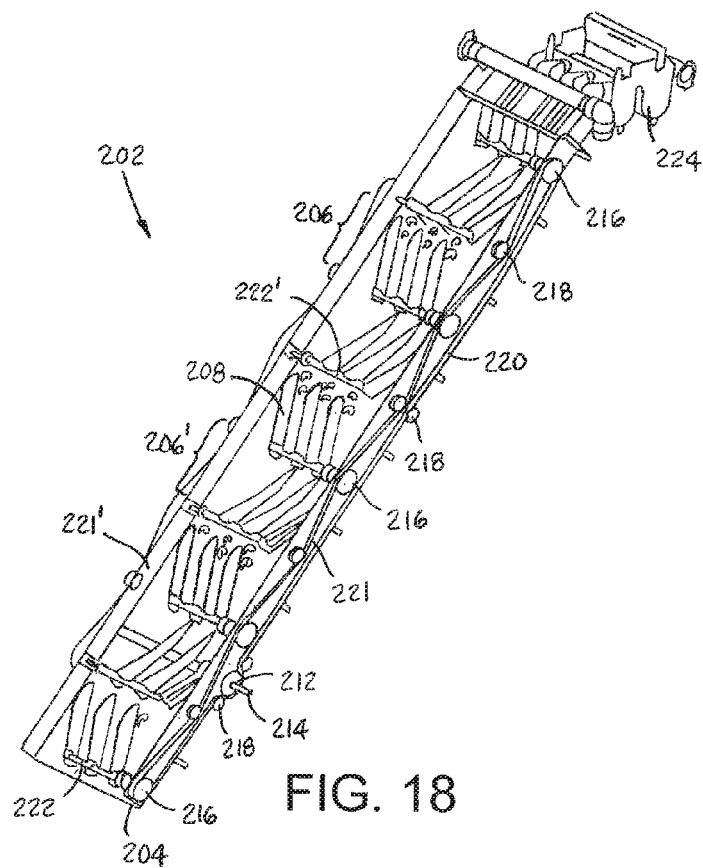
FIG. 18 is an axonometric view of another version of a deveining machine embodying features of the invention.
Figure 19:
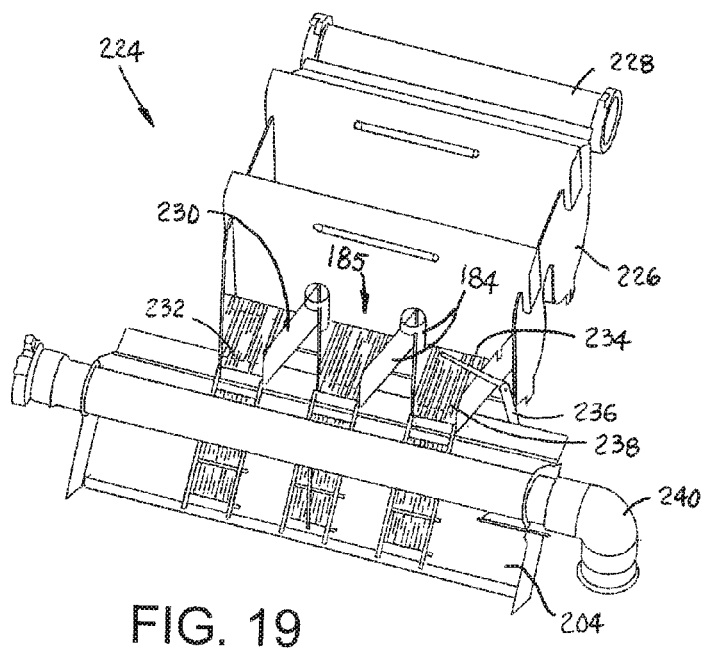
FIG. 19 is an isometric view of the feed system at the upper end of the deveining machine of FIG. 18.

An inclined trough for a deveining machine embodying features of the invention is shown in FIG. 1. The trough 40 can be supported in an adjustable frame with the same accoutrements as illustrated in FIGS. 18 and 19 and described in U.S. Pat. No. 2,694,218, F. S. Lapeyre et al., Nov. 16, 1954. The disclosure of that patent is incorporated into this description by reference. The inclined trough 40 extends in length downward from an upper entrance end 42 to a lower exit end 43. The trough 40 extends in width between two side walls 44, 45 flanking a central base 46. A water supply system (not shown in FIG. 1) with spray nozzles like the water supply system with spray nozzles 34 in FIGS. 18 and 19 provides water to lubricate the inclined base 46 of the inclined trough 40.

A series of blade assemblies 48 are mounted to the base 46. Each blade assembly is arranged at an oblique angle α with the length direction 50 of the trough 40. In this example the blade assemblies 48 are arranged in groups of three across the width of the trough 40. The oblique angles α of the blade assemblies 48 in each group are adjusted together by an angle-adjustment arm 52. Successive groups 53, 53' of blade assemblies extend across and down the base 46 of the trough 40 in successively opposite oblique directions to define a zig-zag path 54 for shrimps 56 to follow down the trough. Each group 53, 53' of blade assemblies 48 has a blade-height adjustment mechanism 58 to adjust blade height above the base surface 60 of the trough 40. (Blade-height adjustment mechanisms for some of the groups 53 are not shown in FIG. 1.) The blade-height adjustment mechanisms 58 include sprockets 62 that can be joined with other sprockets on the same side of the trough 40 by chains (not shown) so that the blade height of multiple groups can be adjusted together. The angle-adjustment arms 52 along the first side wall 44 can also be ganged together by a linkage so that the angle α of all the groups 53 angled downward from the first side wall 44 to the second side wall 45 can be adjusted together. Similarly, all the arms 52 of the oppositely oriented groups 53' can be linked to adjust the angles of those groups. Holes 64 in the ends of the angle-adjustment arms 52 admit a U-pin 66 that spans the side wall 44 and extends through holes closest to the wall on each side to maintain the arm in place and the blade assemblies 48 at the selected angle.

Figure 2:
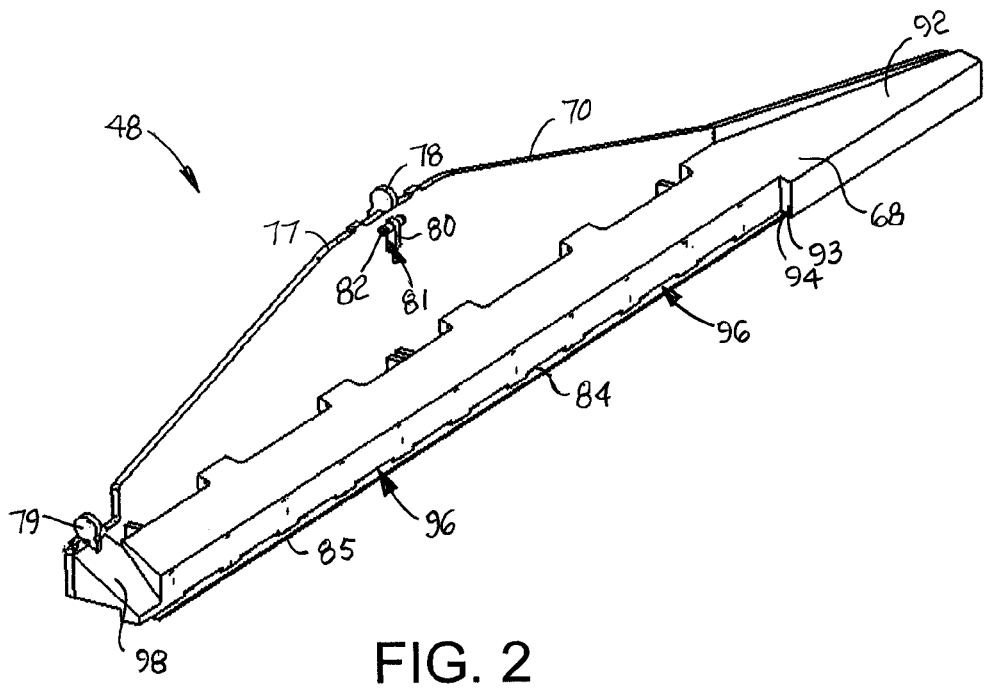
FIG. 2 is an isometric view of a blade assembly usable in a deveining machine as in FIG. 1.
Figure 3:
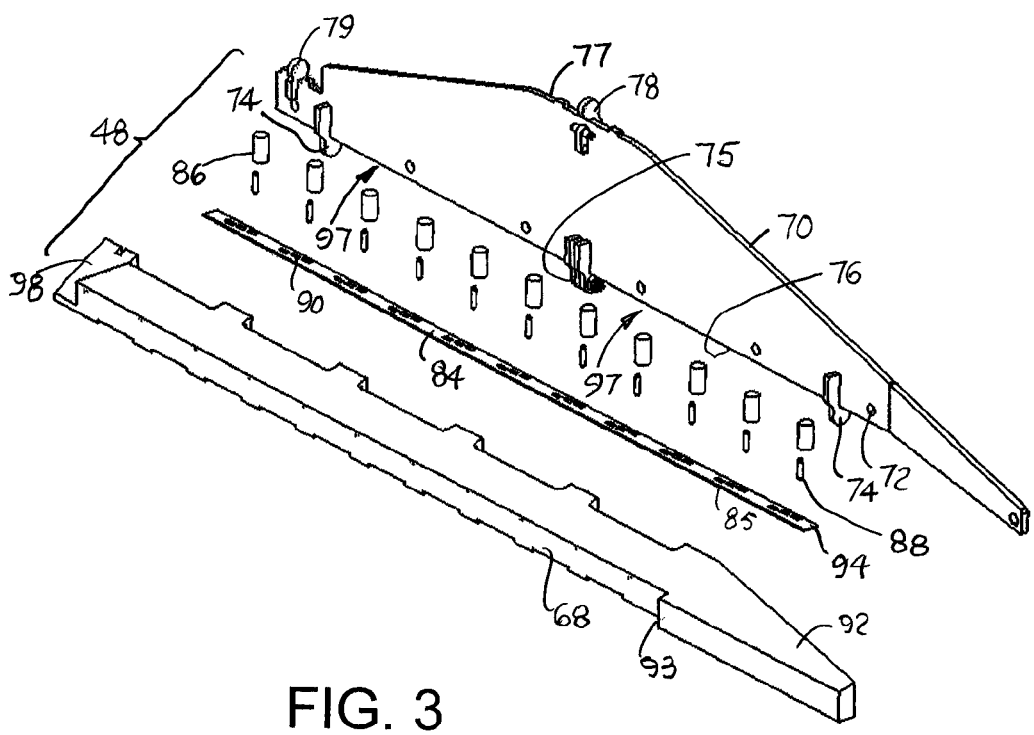
FIG. 3 is an exploded view of the blade assembly of FIG. 2.

A blade assembly 48 is shown in more detail in FIGS. 2 and 3. The blade assembly 48 includes a blade-support block 68 fastened to a plate-like backbone 70. Holes 72 through the bottom of the backbone 70 admit screws or bolts (not shown) to fasten the support block 68 to the backbone. Extending downward of the plate are three feet—two outer ski feet 74 and an intermediate pivot foot 75. The feet 74, 75 are spaced apart along a bottom side 76 of the backbone 70 and sit on the base surface of the trough. Directly opposite the intermediate pivot foot 75 is a first pivot member 78 at a top side 77 of the backbone 70. The first pivot member 78 is shown in the form of a disk with a connected tab 80 received in a slot 81 in the backbone and retained by a pin 82. But the disk could alternatively be a ball. A similar second pivot member 79 is attached to the backbone 70 near one end of the blade assembly 48.

A blade 84 with a knife edge 85 extends outward of the support block 68 in an upstream direction of the trough. The blade is made of a ferromagnetic material, such as a ferromagnetic stainless steel. Permanent magnets 86, such as alnico magnets, embedded in the support block 68 attract the ferromagnetic blade 84 and hold it in position. Dowel pins 88 extending downward from the support block 68 register the blade 84 in one of three sets of slots 90 in the blade. Each set of slots 90 corresponds to a different blade extension from the blade assembly 48 to adjust the depth of the slit into the back membrane of the shrimps. To prevent shrimps from deviating wide of the zig-zag path 54 of FIG. 1 and skipping a blade group 53 or 53', each blade assembly 48 has an extension 92 beyond the blade. As shown in FIGS. 2 and 3, the extension 92 has a protruding portion 93 that extends outward from the support block 68 past the front edge 85 of the blade 84. The protruding portion 93 serves as a guard that prevents shrimps from catching on the end 94 of the blade 84. To prevent water from accumulating at the blade 84, the support block 68 has slots 96 forming channels with the blade to channel water over the blade and through the blade assembly 48. Water is also channeled below the blade 84 in the spaces 97 forming channels between the feet 74, 75. The support block 68 has a ramp 98 recessed into the end at the second pivot member 79 to avoid interference with the angle-adjustment arm that would otherwise limit the tilt range of the blade assembly 48.

Figure 4:
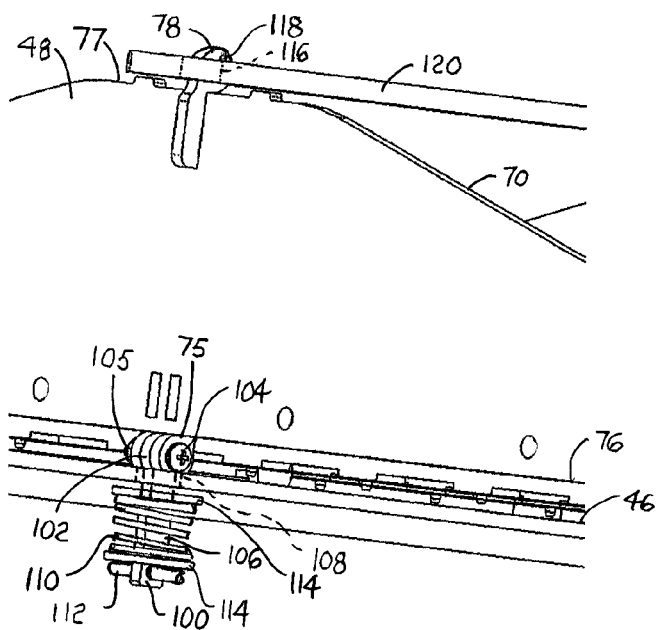
FIG. 4 is an enlarged view of the central portion of a blade assembly as in FIG. 2 installed in a trough.

As shown in FIG. 4, the blade assembly 48 is held down against the trough base surface 46 by a holddown member 100 extending from the bottom 76 of the backbone 70 at the intermediate pivot foot 75. The holddown has an eyelet 102 at its upper end that receives a screw 104 and a nut 105 to retain it in place and form part of the foot 75. A shank 106 extends downward from the eyelet 102 through a hole 108 in the base 46. A spring 110 surrounding the shank 106 is compressed between the base 46 and a retaining pin 112, such as a cotter pin, through a hole in the distal end of the shank. A pair of washers 114 sandwiching the spring 110 serve as spring seats. The compressed spring 110 biases the blade assembly 48 downward against the trough base 46 at the pivot foot 75.

The first pivot member 78 at the top side 77 of the backbone 70 is directly opposite the pivot foot 75 at the bottom side 76. The first pivot member 78 is received in a through hole 116 in a blade-height adjustment arm 120, which is part of the blade-height adjustment mechanism 58 of FIG. 1. The pivot member 78 received in the hole 116 and the arm 120 operate as a universal pivot joint. A retainer 118, such as a cotter pin, through a hole in the top of the first pivot member retains the pivot member in the arm 120.

Figure 5:
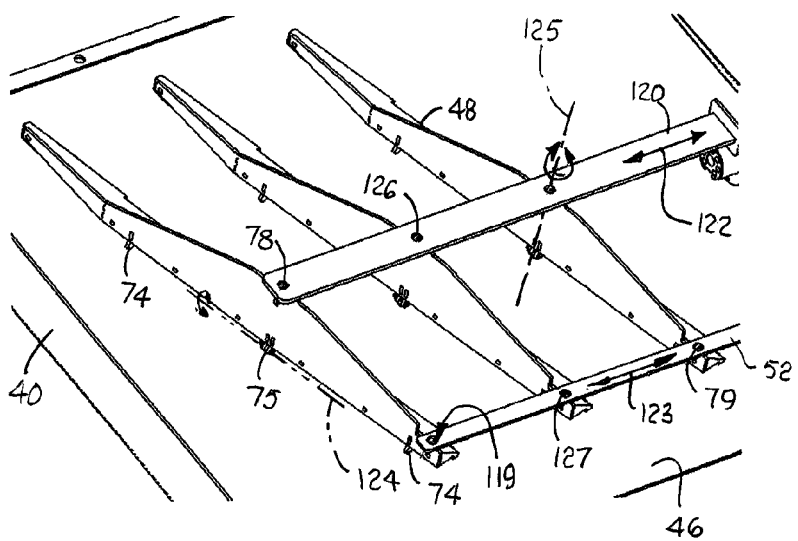
FIG. 5 is an enlarged view of a portion of the inclined trough of FIG. 1.

As shown in FIG. 5, movement of the blade-height adjustment arm 120 in the width direction of the trough 40, as indicated by arrow 122, causes the blade assemblies 48 to tilt on the feet 74, 75 about a pivot axis 124 that lies in the plane of the base surface 46. The second pivot member 79 at the downstream end of each blade assembly 48 is received in a through hole 119 in the angle-adjustment arm 52. Like the first pivot member 78 received in the blade-height adjustment arm 120, the second pivot member 79 received in the angle-adjustment arm 52 forms a universal joint. Movement of the angle-adjustment arm 52 in the width direction of the trough 40, as indicated by arrow 123 pivots the blade assemblies 48 on their feet 78, 79 about a pivot axis 125 perpendicular to the plane of the base surface 46. The universal joints 126, 127 allow the blade-height adjustment to be independent of the blade-angle adjustment. Like the first pivot member 78, the second pivot member 79 is retained in the angle-adjustment arm 120 by a retainer, such as a cotter pin.

The blade-height adjustment arm 120 is connected to the rest of the blade-height adjustment mechanism 58 at the side of the trough 40 as shown in FIGS. 6A and 6B. The mechanism 58 is mounted to the side wall 44 on a mounting bracket 128. An output shaft 130 extends from a rotation counter 132. An input shaft 131 extends from the other side of the rotation counter 132 through holes in the bracket 128 and the side wall 44 to a sprocket 134 with a handle 136. The shaft 130 is rotated by the handle 136 or by a chain driving the sprocket 134 from another sprocket along the trough 40. The output shaft 130 is threaded and received in a threaded bore in a coupling nut 138. The nut 138 is generally cylindrical, but has a flat or a groove on its periphery that mates with a complementary projection on the interior of a ring 140 affixed to the bracket 132. The engagement of the ring 140 with the coupling nut 138 prevents the nut from rotating with the shaft 130. As the threaded shaft 130 is rotated, the coupling nut 138 rides along the shaft to push the blade-height adjustment arm 120 in the direction of the arrow 122. A flange 142 at the end of the arm 120 contacts the end of the nut 138. In FIG. 6A the coupling nut 138 is shown fully retracted for a minimum blade-height setting. In FIG. 6B the coupling nut 138 is shown fully extended for a maximum blade-height setting. The rotation counter 132, which includes a gear train and a display, is coupled to the shafts 130, 131 to measure shaft rotation. The counter 132 displays the blade height, which is proportional to shaft rotation over the small range of allowed tilt angles.

In FIG. 7A, which corresponds to the minimum setting position of the blade-height adjustment nut 130 in FIG. 6A, the arm pushes against the pivot member 78 with a force $F_1$ in the direction shown to tilt the blade assembly 48 about the contact point between the pivot foot 75 and the base surface 46. The tilt produces a minimum height $H_1$ of the blade 84 above the base 46. In FIG. 7B, which corresponds to the setting in FIG. 6B, the blade assembly 48 is tilted by an oppositely directed force $F_2$ to produce a maximum operational blade height $H_2$.

Figure 8:
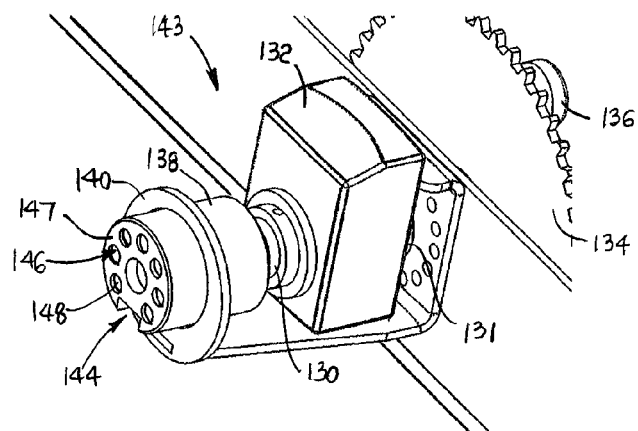
FIG. 8 is an enlarged view of the blade-height adjuster of FIGS. 6A and 6B with the blade-height adjustment arm removed.

FIG. 8 shows the arm-drive portion 143 of the blade-height adjustment mechanism. The arm drive 143 includes the shafts 130, 131, the rotation counter 132, the sprocket 134, and the handle 136. The coupling nut 138 has a groove 144 that mates with a complementary projection on the interior of the ring 140 to prevent the nut from rotating. The coupling nut 138 has circumferentially spaced chambers 146 opening onto a front face 147. Each of the chambers 146 houses a permanent magnet 148. The magnets attract the metal in the flange 142 of the blade-height adjustment arm 120 of FIG. 6A to form a magnetic coupling between the arm and the coupling nut 138. Instead of individual magnets, a magnetic ring embedded in the face 147 of the nut or other magnet arrangements could be used. Or the arm could be affixed to a nut with fasteners instead of magnets. But the magnetic coupling provides certain advantages.

Figure 9:
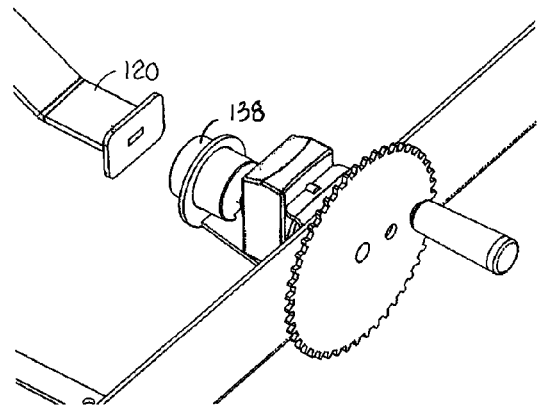
FIG. 9 is an enlarged view of the blade-height adjuster of FIGS. 6A and 6B with the blade-height adjustment arm disengaged for blade replacement.
Figure 10:
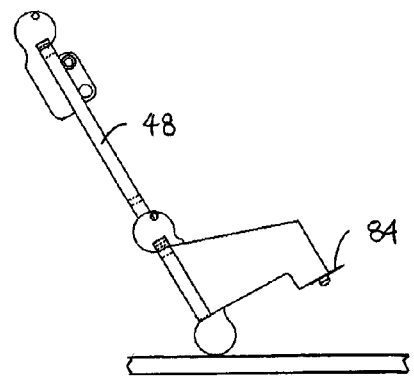
FIG. 10 is a side view of the blade assembly corresponding to the disengaged arm position of FIG. 9 for blade replacement.

As shown in FIG. 9, the blade-height adjustment arm 120 can be easily separated from the magnets in the coupling nut 138 without loosening screws or removing fasteners. Pulling the arm 120 away from the nut 138 tilts the blade assembly 48 up as shown in FIG. 10 to a blade-removal tilt position providing easy access to the blade 84. When the blade 84 is retained by magnets 86 as shown in FIG. 3, its removal, as well as its replacement, is easy with the assembly 48 tilted back that far.

Figure 11:
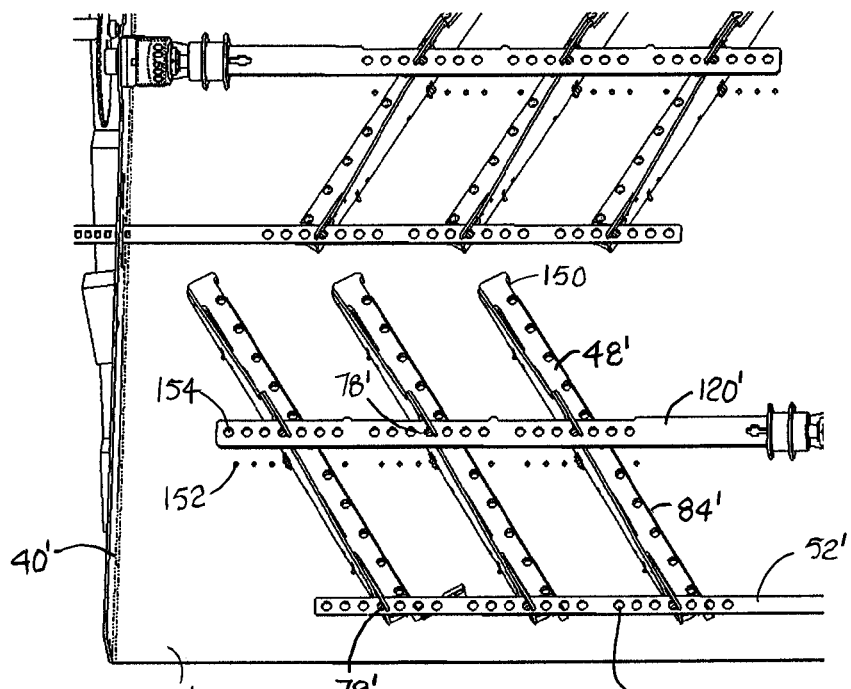
FIG. 11 is a plan view of a portion of the trough of a deveining machine as in FIG. 1 with different blade assemblies.
Figure 12:
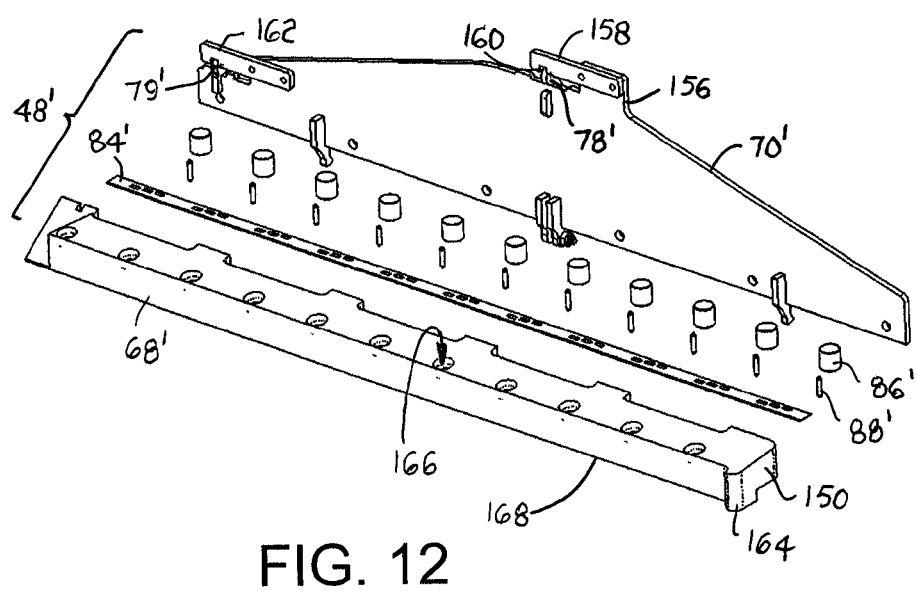
FIG. 12 is an exploded view of the blade assembly of FIG. 11.
Figure 13:
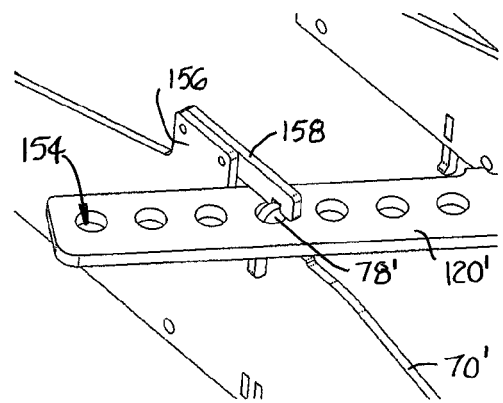
FIG. 13 is an enlarged view of a pivot retention arm on the blade assembly of FIG. 12.

Another version of the blade assemblies is shown in FIGS. 11-13. In this version the blade assemblies 48' do not have extensions 92 as in the blade assembly 48 of FIG. 2. Instead, the blade 84' extends close to the upper end 150 of the blade assembly 48' to ensure that a shrimp's initial contact after leaving an upstream blade assembly is with a blade rather than with a bladeless extension. Holes 152 through the base 46' of the trough 40' and corresponding holes 154, 155 in the blade height-adjustment arm 120' and in the angle-adjustment arm 52' allow the blade assemblies 84' to be moved to different lateral positions across the width of the trough to better capture shrimps descending from the blade assembly immediately upstream. The holes 154 in the blade-height adjustment arm 120' receive the first pivot members 78' of the blade assemblies 48'; the holes 155 in the angle-adjustment arm 52' receive the second pivot members 79'.

As shown in FIGS. 12 and 13, the backbone 70' has a tab 156 to which a retainer arm 158 is fastened. The retainer arm 158 extending from the tab 156 has a notch 160 that receives the head of the first pivot member 78'. Similarly, a second notched retainer arm 162 is used to retain the second pivot member 79'. So, the blade assemblies 48' are shown with retainer arms 156, 158 as alternatives to cotter-pin retainers. The blade 84', the magnets 86', and the dowel pins 88' are the same as in the blade assembly 48 of FIG. 2. The blade support block 68' differs in that it does not include a long extension beyond the upstream end 150. The blade 84' extends just short of the end 150. A guard 164 at the upstream end 150 prevents shrimps from snagging on the corner of the blade 84'. The magnet cavities 166 in the blade support block 68' each terminate in a blind end just short of the bottom side 168 of the block leaving a thin wall between the magnet 86' and the bottom side. The magnets 86' are retained in the cavities 166 with an epoxy or other potting compound.

Figure 14:
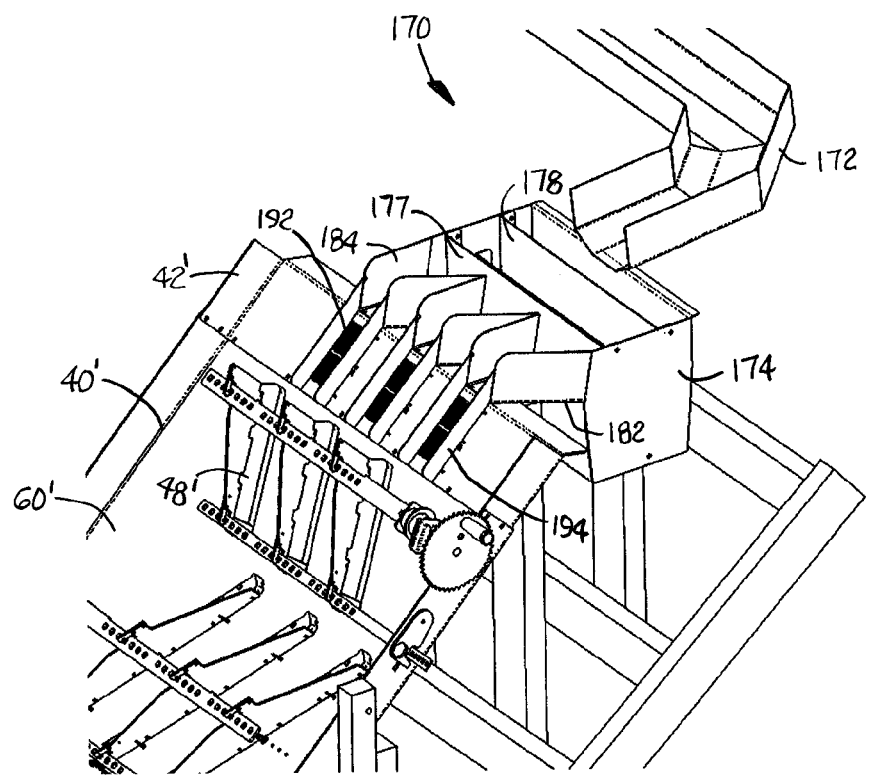
FIG. 14 is an axonometric view of a feed system at the upper end of a deveining machine as in FIG. 1 or FIG. 11.
Figure 15:
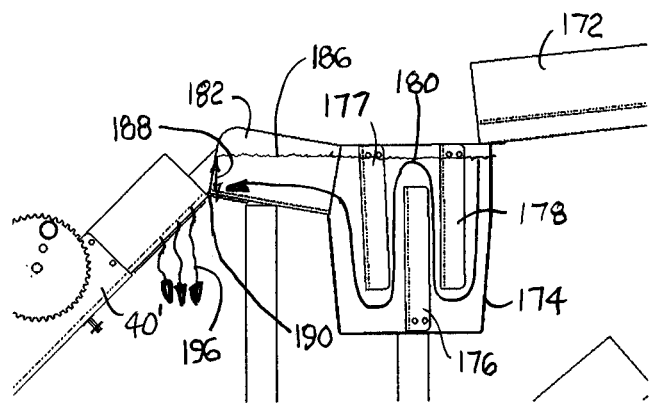
FIG. 15 is a side elevation view of the serpentine weir system in the feed tank of the feed system of FIG. 14.

Shrimps and water are fed into the trough 40' by a feed system 170 at the upper entrance end 42', as shown in FIG. 14. The feed system includes a flume 172 feeding shrimps carried in a continuous flow of water from a source of water into a tank 174. As best shown in FIG. 15, the tank 174 has a central weir 176 flanked by inverted weirs 177, 178 that extend across the width of the tank, as seen in FIG. 14. The central weir 176 extends up from the bottom 175 of the tank 174, and the inverted weirs 177, 178 are spaced above the bottom of the tank and extend upward to a level above the level of the top of the central weir 176. Shrimp-laden water flowing into the tank 174 from the flume 172 follows a serpentine path 180 around the weirs 176, 177, 178 through the tank 174. In following that serpentine path 180, the shrimps tend to separate from each other so that shrimps are delivered to the trough 40' individually. Although three weirs 176, 177, 178 are shown in the tank 174 in FIG. 15, two weirs or more than three could be used.

After leaving the tank 174, the shrimps travel along a ramp 182 with vertical lane dividers 184 converging toward the trough 40'. The lane dividers 184 divide the shrimps into, in this example, three lanes 185 (shown in FIG. 16) corresponding to the three blade assemblies 48' in each group. The converging lane dividers 184 funnel the shrimps into a single file as they flow from the ramp 182 and onto the trough 40'. As shown in FIG. 15, the water level 186 is maintained high enough so that its height 188 above the exit 190 of the ramp is small enough that stacked shrimps are unlikely to pass through.

Figure 16:
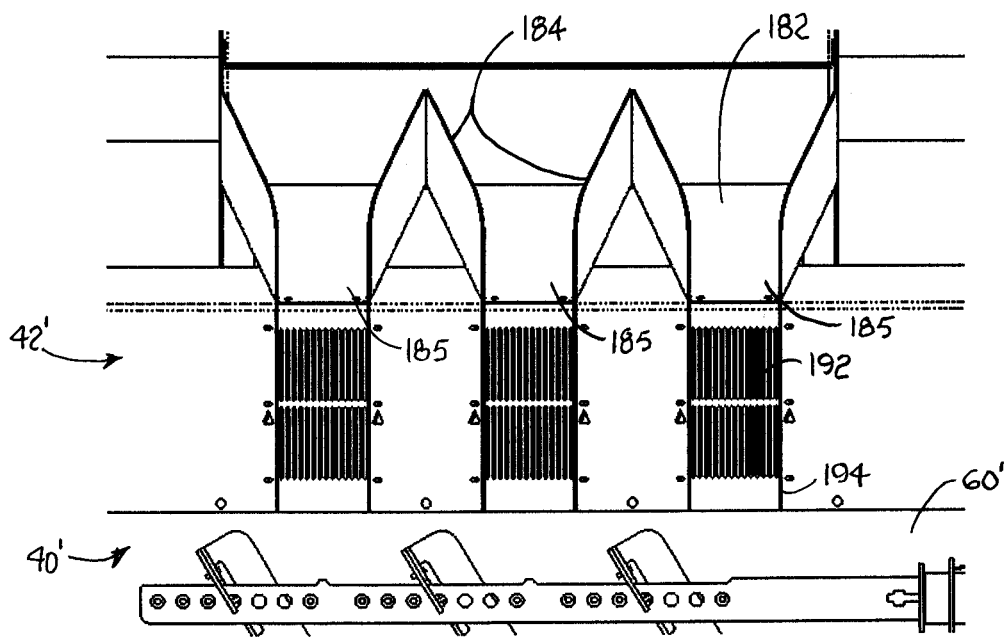
FIG. 16 is a top view of the upper portion of the feed system of a deveining machine as in FIG. 1 or FIG. 11.

Because the amount of water required to flow the shrimps along the serpentine path 180 through the tank 174 and over the ramp 182 exceeds the amount of water needed to lubricate the trough 40', the upper end 42' of the trough has elongated drain openings 192, as shown in FIGS. 14 and 16. Side walls 194 extend the lanes 185 formed by the lane dividers 184 onto the top end 42' of the trough 40'. The shrimps and water flow over the drain openings 192. The excess water drains through the openings 192, as shown by the wiggly arrows 196 in FIG. 15. The remaining water is sufficient to lubricate the trough 40' and flow the shrimps. The base surface 60' has a sanded or otherwise slightly roughened finish (#3 or #4 finish, for example) that facilitates the flow of water down the trough 40' and prevents shrimps from sticking and not advancing.

Figure 17:
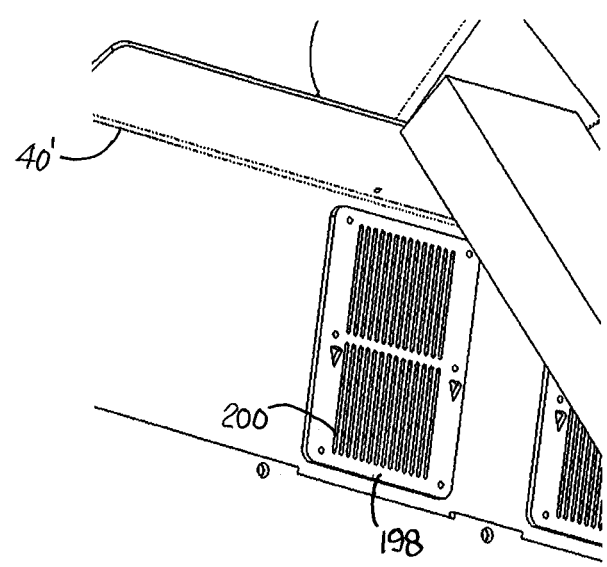
FIG. 17 is a bottom view of an adjustable drain grate in the feed system of FIG. 16.

The effective size of the drain openings 192 and, so, the percentage of water they drain is adjusted by grate plates 198 on the bottom side of the trough 40' as shown in FIG. 17. Elongated openings 200 in the grate plate 198 generally match the openings 192 in the base of the trough. The grate plate 198 can be positioned to align the openings 200 in the grate with the drain openings in the trough for maximum drainage. And the grate plate 198 can be shifted in either or both of two dimensions to misalign the openings and partially or completely occlude the trough openings to reduce the effective drain openings and the amount of water drained. Thus, the drain openings in the trough and the translatable grate plate form an adjustable drain grate.

Another version of a deveining machine is shown in FIG. 18 with the support frame omitted for clarity. The deveiner 202 comprises an inclined trough 204 and nine groups 206 of trios of blade assemblies 208. (Other numbers of groups and blade assemblies in each group are possible with troughs of various lengths and widths.) Unlike the blade assemblies 48 in the deveiner of FIG. 1, the blade assemblies 208 in FIG. 18 are shown at predetermined, fixed angular orientations without angle-adjustment arms. But the blade assemblies 208 could be outfitted with angle-adjustment arms. A blade-height adjustment mechanism 210 including a master sprocket 212, an adjustment handle 214 attached to the master sprocket, slave sprockets 216, snubber and guide sprockets 218, and a chain 220 trained around the sprockets is used to adjust the blade height. The slave sprockets 216 on a first side 221 of the trough 204 are coupled to blade-height adjustment arms 222 of the odd groups 206 of blade assemblies 208. A similar chain and sprocket arrangement on a second side 221' of the trough 204 is coupled to blade-height adjustment arms 222' of the alternately positioned even groups 206' of blade assemblies 208. The blade-height adjustment mechanisms on both sides are coupled together so that both groups 206, 206' of blade assemblies 208 can be adjusted together. A master sprocket with a handle is provided on the second side 221', which allows manual blade-height adjustment from either side.

Shrimps are fed into the trough 204 by a feed system 224 at the inclined trough's upper end. The feed system 224 is shown in more detail in FIG. 19. Shrimps deposited in a tank 226 are flowed through a sinuous path around weirs as in the tank 178 in FIG. 15. Water supplied by a pipe 228 creates a flow through the tank that spreads the shrimps more uniformly across the width of the tank 226. Upon exiting the tank 226, the shrimps are separated by lane dividers 184 into parallel channels 185—three channels in this example. Bumpers 230 covering the vertices of the lane dividers 184 present a radius of curvature much greater than that of the vertices and greater than those of curled shrimps to prevent shrimps from hooking on the vertices of the lane dividers. Each channel 185 has a ramp 232 that is hinged at an upper end 234. The ramps 232 are tilted up or down about the hinge at the upper end 234 by a ramp-height adjustment mechanism 236 coupled to the ramps. The tiltable ramps 232 form beaches adjustable to the appropriate height for the average size of shrimps in the batches being processed. For large shrimps the ramps 232 are lowered so that the depth of water above the beaches (see FIG. 15) is enough to urge the large shrimps onto the trough 204 without beaching. For small shrimps the ramps 232 are raised so that the depth of water above the beaches is not so great as to cause the small shrimps to wheel along the beaches instead of riding along the beaches flat on one side. Openings 238 in the ramps 232 can provide enough open area to drain all the water exiting the tank 226 to a recirculation system. Or the openings can be narrower to allow some of the water to flow onto the trough as in the system of FIG. 15. An optional second source of water 240 is provided to lubricate the trough 204 if it is desirable not to use the dirty water from the tank 204 to urge the shrimps down the trough.

Figure 20:
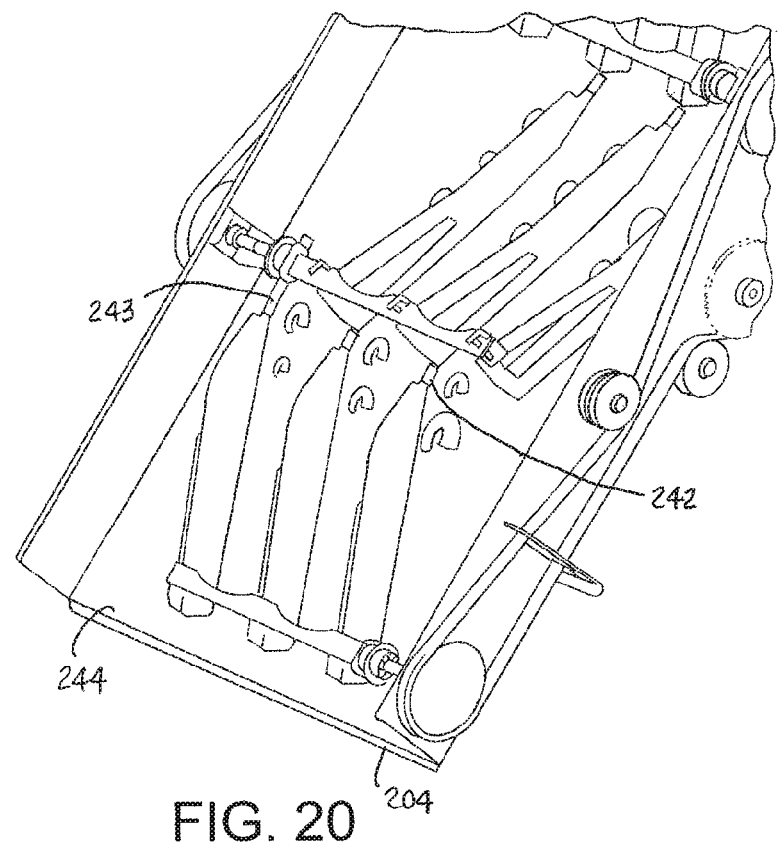
FIG. 20 is an axonometric view of a portion of the inclined trough of the deveining machine of FIG. 18 showing groups of blade assemblies.

As shown in more detail in FIG. 20 than in FIG. 18, the blade assemblies 208 are fixed at empirically determined angles oblique to the longitudinal direction of the trough 204. Stops 242, 243 in the form of plates extending upward from the base 244 of the trough 204 at the upper ends of the blade assemblies 208 between consecutive groups of blade assemblies prevent shrimps from straying off their intended paths as they pass from one blade assembly to the next.

Figure 21A:
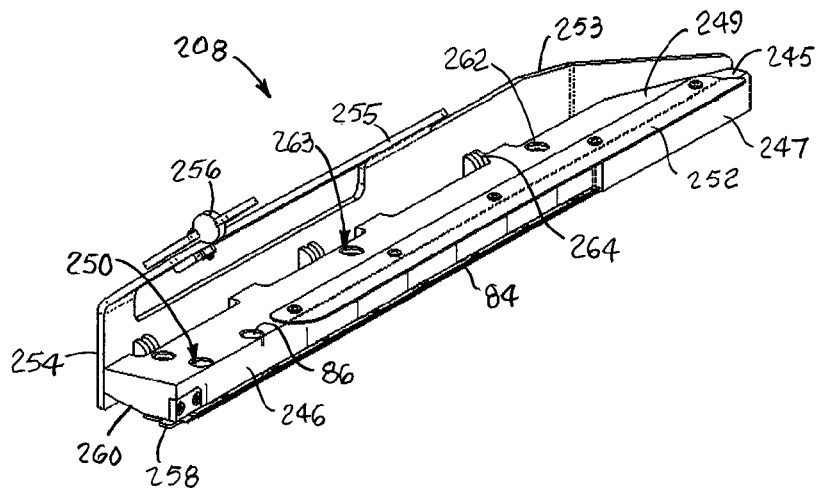
FIGS. 21A and 21B are axonometric and exploded views of the blade assembly for a deveining machine as in FIG. 18.
Figure 21B:
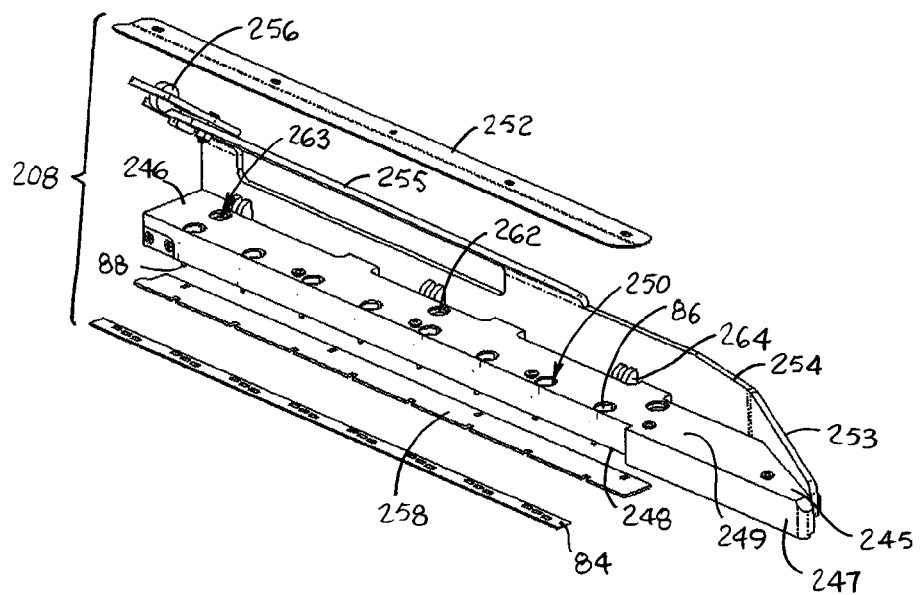

The blade assemblies 208 shown in FIGS. 21A and 21B differ from those in FIGS. 3 and 12. The blade-support block 246 is similar to that shown in FIG. 3, but it does not have slots forming flow channels above the blade. Instead, its bottom surface 248 is flat, although it could have slots forming flow channels with the blade 84. The blade 84, dowel pins 88, and magnets 86 are the same, except that the magnets are inserted from the top into blind holes 250 and epoxied in place. A guard 252 extending outward over the blade 84 from the top surface 249 of the block 246 helps maintain shrimps in a side-down position for their encounter with the blade. The block 246 has a protrusion 245 extending past the blade 84 to the upstream end of the blade assembly 208. The protrusion has an outer receiving face 247 positioned relative to the exit end of the corresponding blade assembly of the immediate upstream blade group so that the shrimps' initial impact in passing from one blade group to the next is with the outer receiving face and not with the blade 84, which could cut too deeply into the shrimps. The shrimps are then guided along the receiving face 247 into less forceful contact with the blades 84. The blade-support block 246 is mounted to a backbone 253 that includes a lower portion 254 backing the blade-support block 246 and an upper portion 255 forming an acute angle with the lower portion. One end of the upper portion 255 supports a pivot member 256 engaged by the blade-height adjustment arm (222, FIG. 18). A blocking plate 258 hingedly attached to the bottom surface 248 of the block 246 is described in more detail in reference to FIGS. 23A and 23B. The ferromagnetic blocking plate 258 is held in place in a blocking position by the blade-holding magnets 86. In a non-blocking position the blocking plate 258 is held against a beveled rear face 260 of the block 246 by a second set of magnets 262 epoxied in rear holes 263 in the block. Hinge eyes 264 at the bottom of the lower portion 254 of the backbone 253 form feet for the blade assembly 208.

Figure 22:
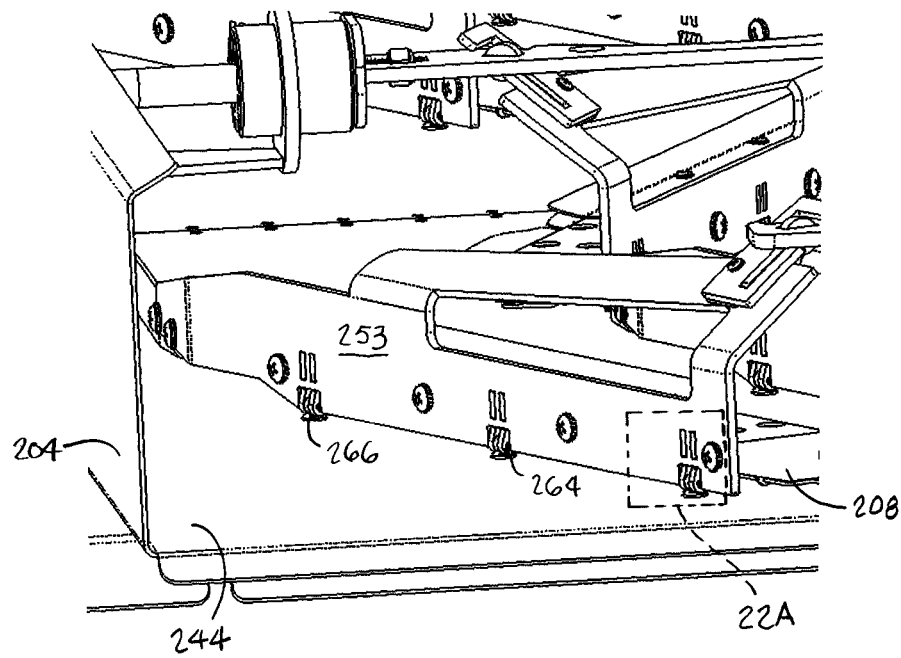
FIG. 22 is an axonometric view of a portion of the rear of a blade assembly in the deveining machine of FIG. 18.
Figure 22A:
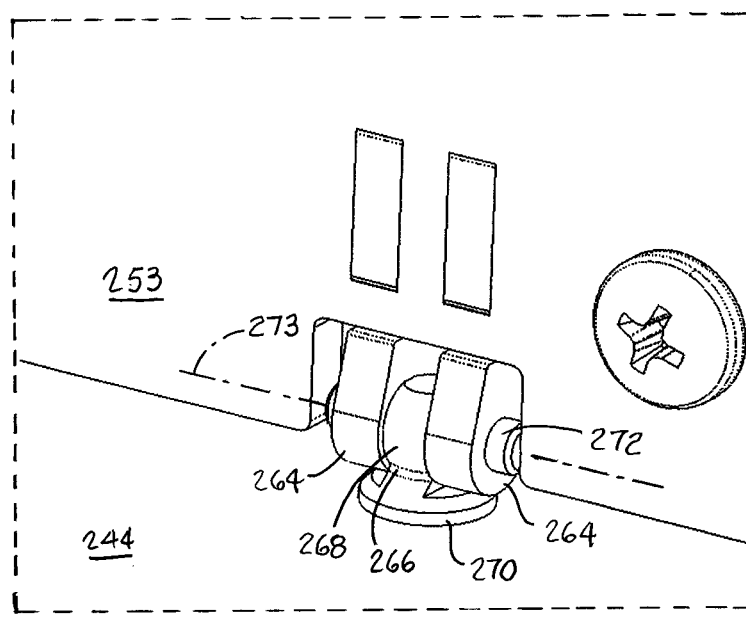
FIG. 22A is an enlarged view of one of the holddowns for the blade assembly of FIG. 22.

The connection of the blade assemblies 208 to the base 244 of the trough 204 is shown in more detail in FIGS. 22 and 22A. In this example, which is an alternative to the spring-biased holddown shown in FIG. 4, three pairs of hinge eyes 264 are mounted at the bottom of the backbone 253. A holddown member 266 has an upper head 268 mounted on a pedestal 270. The head 268 has a hole that is aligned with holes in the blade assembly's flanking pair of hinge eyes 264 to receive a hinge pin 272 defining a tilt axis 273 about which the blade assembly 208 pivots for blade-height adjustment or for blade replacement. A threaded shank (not shown) extends downward from the holddown's pedestal 270 through a hole in the base 244. A nut and washer (not shown) on the threaded shank on the underside of the base 244 fasten the holddown to the trough 204.

Figure 23A:
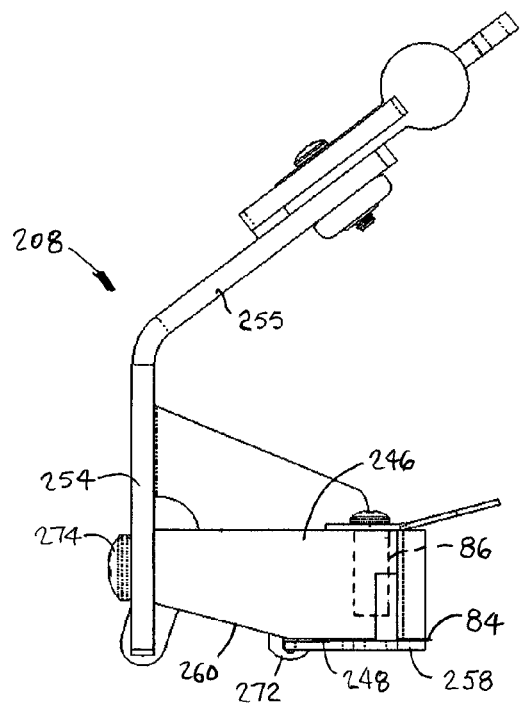
FIGS. 23A and 23B are side elevation views of one of the blade assemblies of FIG. 20 showing a hinged blocking plate in a blocking position under the blade for large shrimps and in an unblocking position away from the blade for small shrimps.
Figure 23B:
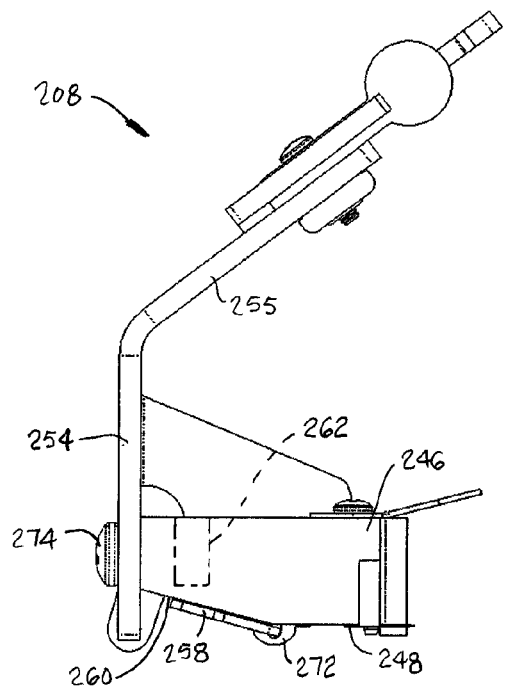
Figure 25:
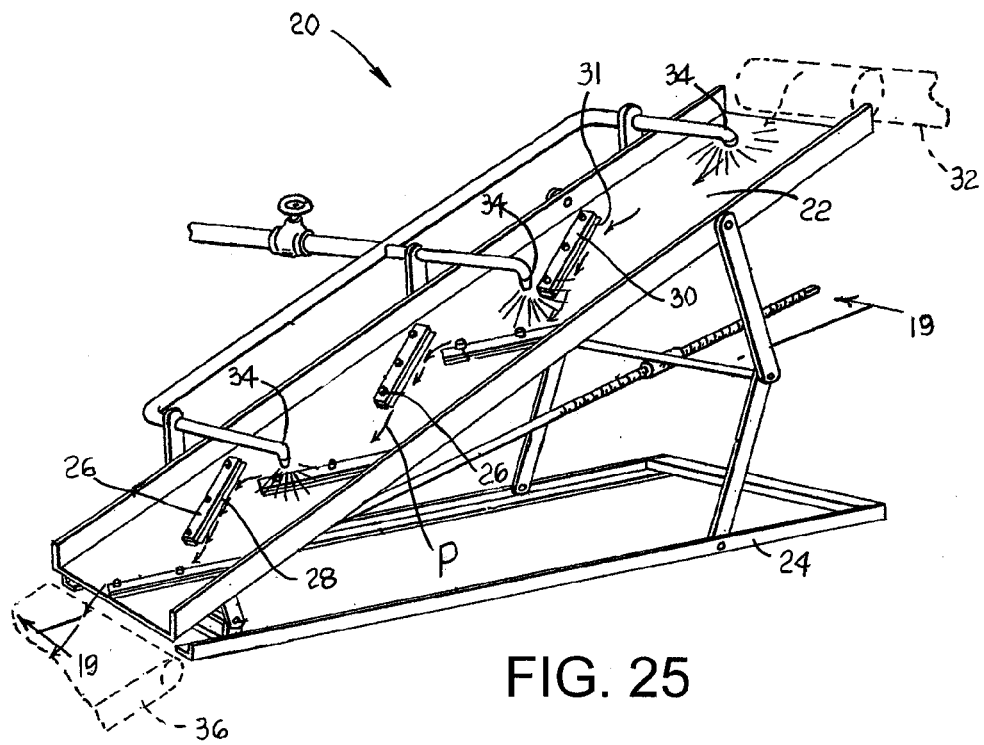
FIG. 25 is an isometric view of a prior art deveining machine.
Figure 26:
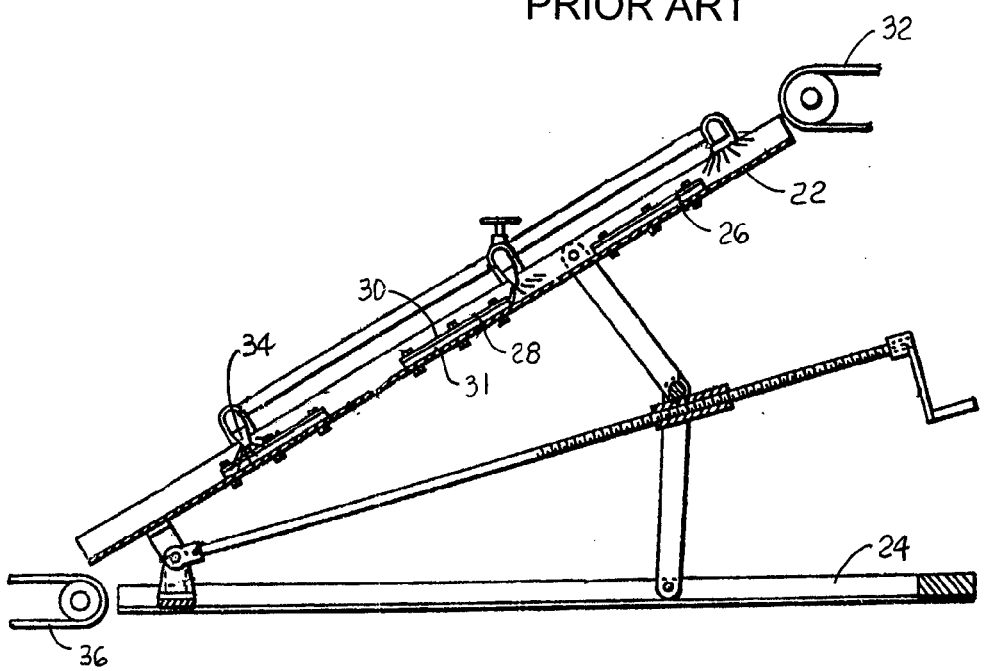
FIG. 26 is a cross section of the deveining machine of FIG. 11 taken along lines 19-19.

The function of the blocking plate 258 is described in more detail with reference to FIGS. 23A and 23B. The blocking plate 258 in FIG. 23A is held in a blocking position just below the blade 88 by the blade-retention magnets 86. The blocking plate 258 is set to the blocking position for large shrimps to limit the depth of the cut by filling the gap between the blade assembly and the base of the trough. FIG. 23B shows the blocking plate 258 in a retracted, non-blocking position for use with batches of small shrimps. Because the blade height is set much lower for small shrimps, the gap between the bottom 248 of the blade assembly 208 and the trough is small enough that the blocking plate 258 is not necessary. In the non-blocking position shown in FIG. 23B, the blocking plate 258 is held in place against the blade-support block's beveled rear face 260 by the blocking-plate magnets 262. Loops 272 protruding downward from the bottom 248 of the blade-support block 246 through openings in the blocking plate 258 pivotally attach the blocking plate to the blade assembly 208.

Figure 24:
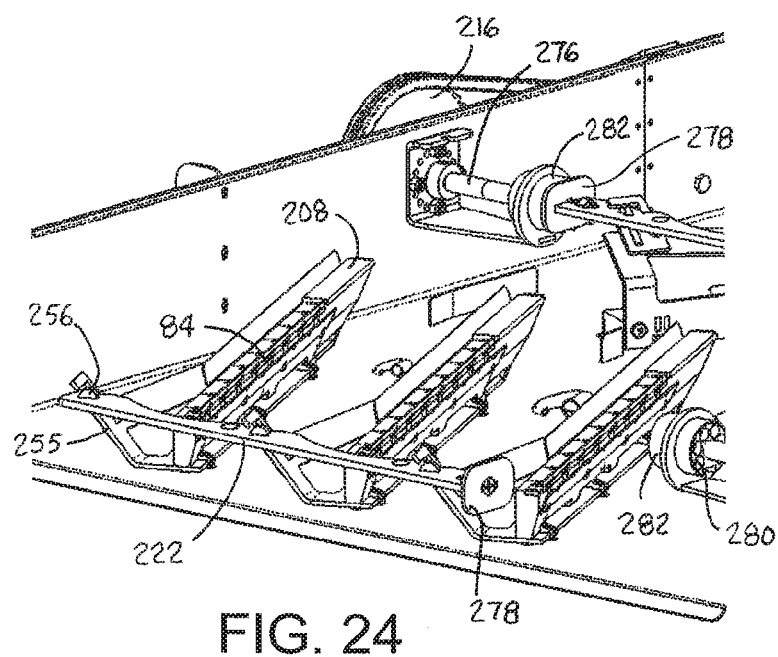
FIG. 24 is an axonometric view of one group of blade assemblies as in FIG. 23A tilted back for blade replacement.

FIGS. 23A and 23B also show in more detail the angled backbone 253 of the blade assembly 208. The lower portion 254 is affixed to the rear of the blade-support block 246 by screws or bolts 274. The blade-height adjustment's pivot member 256 is attached to the upper angled portion 255 of the backbone 253. The angled backbone 253 enables the blade assembly 208 to be tilted back farther than the blade assemblies of FIGS. 3 and 12 with straight backbones. In FIG. 24 the blade assemblies 208 are shown tilted all the way back for easy access to the blade 84. The pivot member 256 of each blade assembly 208 on the angled upper portion 255 of the backbones 253 is received in a hole in the blade-height adjustment arm 222. In normal operation the adjustment arm 222 is magnetically retained to a shaft 276 connected to one of the master or slave sprockets 216. A ferromagnetic flange 278 is held by magnets 280 epoxied into blind holes opening onto the rear of a coupling nut 282. Rotation of the shaft 276 drives the coupling nut 282 along the length of the shaft to push or pull the adjustment arm 222, which tilts the blade assembly 208 and adjusts the blade height over a small range. When the adjustment arm 222 and its flange 278 are manually separated from the coupling nut 282 and the magnetic coupling of the magnets 280, the blade assemblies 208 can be tilted back all the way for easy access to the blades 84.

Although the invention has been described in connection with a few versions, the features in each version are not necessarily specific to that version and could be used in one of the other versions.

What is claimed is:

1. A shrimp deveining machine comprising:
    an inclined trough having a base surface down which shrimps advance;
    a water supply to the inclined trough;
    a series of blade assemblies holding blades spaced above the base surface and extending obliquely across and down the trough in successively opposite oblique directions;
    wherein the blade assemblies include channels to allow water to pass through the blade assemblies without building up at the blades.

2. A shrimp deveining machine as in claim 1 wherein the series of blade assemblies have spaced apart feet sitting on the base surface below the blades and forming the channels along the base surface of the trough between the spaced apart feet.

3. A shrimp deveining machine as in claim 1 wherein the channels are formed above the blades.

4. A shrimp deveining machine as in claim 1 further comprising a blade-height adjuster connected to each of the blade assemblies to tilt the blade assemblies and adjust the height of the blade above the base surface.

5. A shrimp deveining machine as in claim 1 further comprising a blade-angle adjuster connected to each of the blade assemblies to pivot the blade assemblies and adjust their oblique directions.

6. A shrimp deveining machine comprising:
    an inclined trough having a base surface down which shrimps advance;
    a series of blade assemblies holding blades with blade edges spaced above the base surface and extending obliquely across and down the trough in successively opposite oblique directions;
    wherein each of the blade assemblies has a bottom side and an opposite top side and includes a pivot foot at the bottom side at the base surface and a first pivot member at the top side;
    a blade-height adjustment mechanism including a height-adjustment arm pivotally connected to the first pivot member to pivot the blade assembly on the pivot foot about a tilt axis on the base surface to adjust the height of the blade edge above the base surface.

7. A shrimp deveining machine as in claim 6 further comprising:
a holddown member extending through the base surface from the bottom side of the blade assembly at the pivot foot;
a spring connected to the holddown member to bias the blade assembly downward against the base surface of the trough.

8. A shrimp deveining machine as in claim 6 further comprising:
a holddown member extending through the base surface at the pivot foot, wherein the holddown member includes a head at the base surface having a hole;
wherein the pivot foot includes a pair of hinge eyes having holes aligned with the hole in the holddown member;
a hinge pin extending though the aligned holes to pivotally retain the blade assembly to the inclined trough.

9. A shrimp deveining machine as in claim 6 wherein the blade-height adjustment mechanism further includes a display for displaying the height of the blade above the base surface of the trough.

10. A shrimp deveining machine as in claim 6 wherein the blade-height adjustment mechanism further includes an arm drive having magnets forming a magnetic coupling with the height-adjustment arm.

11. A shrimp deveining machine as in claim 10 wherein the height-adjustment arm is separable from the arm drive to pivot the blade assembly about the tilt axis to a blade-removal tilt position exposing the blade for removal.

12. A shrimp deveining machine as in claim 6 further comprising an angle-adjustment arm and wherein blade assembly includes a second pivot member spaced apart from the first pivot member and pivotally connected to the angle-adjustment arm to pivot the blade assembly on the pivot foot about a pivot axis perpendicular to the base surface to adjust the oblique angle of the blade.

13. A shrimp deveining machine as in claim 6 wherein the blades are made of a ferromagnetic material and wherein the blade assemblies include magnets attracting the blades and retaining the blades in place in the blade assemblies.

14. A shrimp deveining machine as in claim 13 further comprising a ferromagnetic blocking plate hingedly attached to the bottom side of each of the blade assemblies and movable from a blocking position in a gap between the blade and the base surface of the inclined trough and a non-blocking position out of the gap wherein the ferromagnetic blocking plate is held in the blocking position by the magnets.

15. A shrimp deveining machine as in claim 6 wherein the base surface has a roughened finish.

16. A shrimp deveining machine as in claim 6 wherein each of the blade assemblies includes an outer receiving face extending from the blade to an end of the blade assembly and positioned to receive the initial impacts of the shrimps advancing down the base surface and guide the shrimps to the blade.

17. A shrimp deveining machine as in claim 6 wherein each of the blade assemblies includes a blade-support block supporting the blade and a backbone having a lower portion attached to the blade-support block and extending upward from the bottom side and an upper portion extending downward from the top side to form an acute angle with the bottom portion.

18. A shrimp deveining machine as in claim 6 further comprising a blocking plate hingedly attached to the bottom side of each of the blade assemblies and movable from a blocking position in a gap between the blade and the base surface of the inclined trough and a non-blocking position out of the gap.

19. A shrimp deveining machine as in claim 6 further comprising stops extending outward from the base surface of the inclined trough between consecutive blade assemblies to prevent the shrimps from straying from the blade assemblies.

20. A shrimp deveining machine as in claim 6 further comprising an angle-adjustment arm pivotally connected to the first pivot member to pivot the blade assembly on the pivot foot about a pivot axis perpendicular to the base surface to adjust the oblique angle of the blade.

21. A shrimp deveining machine comprising:
an inclined trough extending from an upper entrance to a lower exit and having a base surface;
a series of blade assemblies holding blades spaced above the base surface and extending obliquely across and down the trough in successively opposite oblique directions;
a feed system delivering shrimps to the inclined trough at the upper entrance and including:
a source of water providing a flow of shrimp-laden water; and
a tank forming a serpentine path for the shrimp-laden water.

22. A shrimp deveining machine as in claim 21 wherein the tank includes a bottom and wherein the tank further includes at least one weir extending upward from the bottom of the tank and at least one inverted weir spaced above the bottom of the tank to form the serpentine flow path for the shrimps around the at least one weir and the at least one inverted weir though the tank.

23. A shrimp deveining machine as in claim 21 further comprising a ramp between the tank and the entrance of the inclined trough, wherein the shrimps exiting the tank flow up the ramp and onto the inclined trough.

24. A shrimp deveining machine as in claim 23 further comprising a ramp-height adjustment mechanism for adjusting the height of the ramp between a raised position for batches of small shrimps and a lowered position for batches of larger shrimps.

25. A shrimp deveining machine as in claim 23 further comprising:
openings in the ramp to divert the water flowing from the tank away from the inclined trough; and
a second source of water to lubricate the trough.

26. A shrimp deveining machine as in claim 21 further comprising a drain in the inclined trough at the entrance to divert some of the water flowing from the tank away from the inclined trough, wherein the drain includes an adjustable grate to control the amount of water diverted from the inclined trough.

27. A shrimp deveining machine as in claim 21 further comprising a blade-height adjustment mechanism connected to the blade assembly to tilt the blade assembly and adjust the height of the blade above the base surface.

* * * * *